United States Patent
Gradu

(10) Patent No.: US 6,645,108 B1
(45) Date of Patent: Nov. 11, 2003

(54) ACTIVE TORQUE BIAS SYSTEM AND CONTROLS

(75) Inventor: Mircea Gradu, Wooster, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 10/147,744

(22) Filed: May 16, 2002

(51) Int. Cl.[7] .............................................. F16H 37/06
(52) U.S. Cl. ...................................... 475/151; 180/249
(58) Field of Search ......................... 180/249; 475/150, 475/151

(56) References Cited

U.S. PATENT DOCUMENTS

| | | | |
|---|---|---|---|
| 4,417,641 A | | 11/1983 | Kageyama |
| 4,440,042 A | | 4/1984 | Holdeman |
| 4,606,446 A | | 8/1986 | Watanabe |
| 4,656,889 A | | 4/1987 | Mueller |
| 4,766,973 A | * | 8/1988 | Kashihara et al. .......... 180/249 |
| 4,803,628 A | | 2/1989 | Hayashi et al. |
| 4,805,721 A | * | 2/1989 | Takahashi et al. .......... 180/248 |
| 4,860,612 A | | 8/1989 | Dick et al. |
| 4,871,049 A | | 10/1989 | Okita |
| 4,989,686 A | | 2/1991 | Miller et al. |
| 5,002,147 A | | 3/1991 | Tezuka et al. |
| 5,090,510 A | * | 2/1992 | Watanabe et al. ........... 180/249 |
| 5,208,755 A | * | 5/1993 | Tezuka ....................... 180/249 |
| 5,497,333 A | | 3/1996 | Sasaki |
| 5,733,222 A | | 3/1998 | Kawahara et al. |
| 5,980,415 A | | 11/1999 | Showalter |
| 6,142,905 A | | 11/2000 | Brown et al. |
| 6,158,303 A | | 12/2000 | Shiraishi et al. |

* cited by examiner

Primary Examiner—Dirk Wright
(74) Attorney, Agent, or Firm—Polster, Lieder, Woodruff & Lucchesi, L.C.

(57) ABSTRACT

An automotive vehicle has wheels on primary and secondary axles to which power from a motor and transmission is delivered through a transfer case. The transfer case apportions the torque between the primary and secondary axles to best suit the conditions under which the vehicle operates. The torque for the primary axle passes through the transfer case without experiencing slippage. The torque for the secondary axle is extracted at a torque bias coupling which includes a magnetic particle clutch and planetary gear set organized such that two paths exist through the coupling—one a clutch path in which slippage occurs and the other a mechanical path in which no slippage occurs. Most of the extracted torque passes through the mechanical path, but the magnetic particle clutch controls the amount of the torque extracted by the coupling. That coupling dissipates power as a consequence of the slippage in it, and a controller monitors the operation of the clutch to insure that the power dissipation, which manifests itself as heat, does not exceed prescribed limits.

22 Claims, 7 Drawing Sheets

ACTIVE TORQUE BIAS SYSTEM AND CONTROLS

CROSS REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

This invention relates in general to the apportionment of torque between the axles of an automotive vehicle and, more particularly, to a torque biasing unit and a control system for it.

While most four real wheel automotive vehicles operate with the engine torque delivered to only the front wheels or the rear wheels, some vehicles, particularly the more sophisticated ones, are equipped with all wheel drive systems. In the typical vehicle so equipped, the engine torque is delivered to all four wheels all the time, but usually one set of wheels constitutes the primary driving wheels in that they are connected directly to the vehicle transmission, while the other set, known as the secondary wheels, is connected indirectly through a mechanism which accommodates for variations in velocity between the primary and secondary wheels. For example, when a vehicle negotiates a turn, the primary wheels follow arcs having radii different from the radii of the arcs followed by the secondary wheels, and as a consequence the primary and secondary wheels rotate at different angular velocities.

Some of these mechanisms have the capacity to apportion the engine torque between the primary and secondary wheels, with the apportionment depending on driving conditions. For example, a vehicle will accelerate best with most of the torque—and tractive effort—delivered through the rear wheels. On the other hand, when a turn is negotiated, it is best to transfer some of the torque to the front wheels. Certainly, when the primary wheels lose traction, more torque should be transferred to the secondary wheels. However, the mechanisms for apportioning torque are cumbersome and difficult to control. The typical mechanism involves a clutch having friction surfaces along which slippage occurs. This slippage is just one of multiple parameters involved in the control of the clutch.

BRIEF SUMMARY OF THE INVENTION

The present invention resides in a transfer unit for apportioning torque between the primary and secondary axles of an automotive vehicle and a control strategy for the transfer unit. The transfer unit contains a torque bias coupling for extracting the torque for the secondary axle, and that coupling includes a clutch and a planetary gear set organized such that the extracted torque takes two paths through it—one a clutch path in which slippage can occur and the other a mechanical path in which no slippage occurs. The slippage in the clutch of the clutch path dissipates power, which manifests itself as heat, and the controller monitors the power dissipated to insure that it does not exceed prescribed limits for the conditions under which the automotive vehicle operates. The invention also resides in the process embodied in the operation of the transfer unit and controller.

DETAILED DESCRIPTION OF INVENTION

Figure 1:
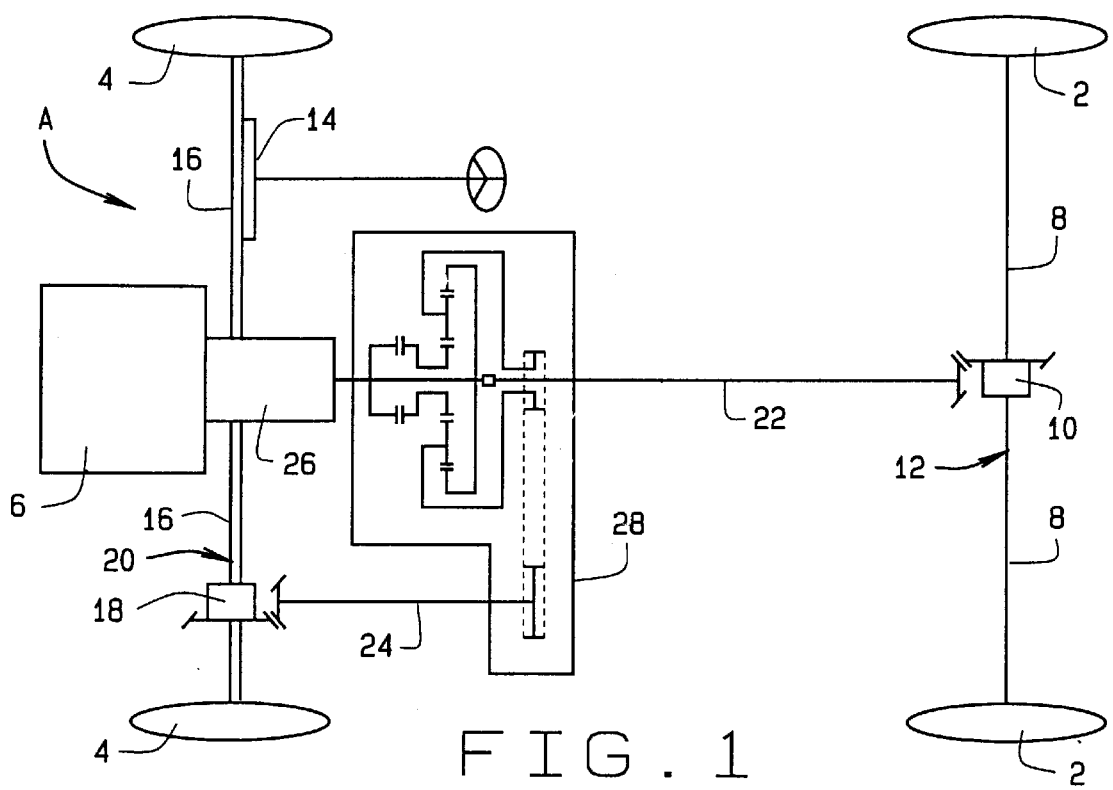
FIG. 1 is a schematic view of an automotive vehicle equipped with the active torque bias system of the present invention.
Figure 3:
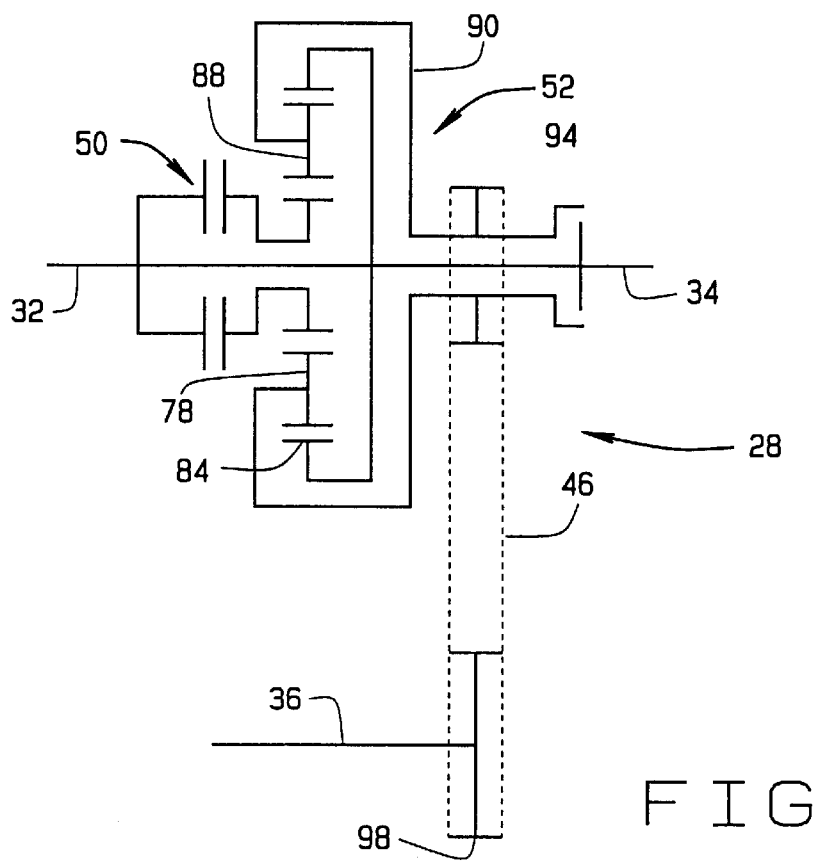
FIG. 3 is a kinematic diagram of the transfer case of FIG. 2.

Referring now to the drawings, an automotive vehicle A has (FIG. 1) four wheels arranged in two sets, that is to say, two rear wheels 2 and two front wheels 4. In addition, the vehicle A has an engine 6 which is coupled to all four wheels 2 and 4 so as to propel the vehicle A. The rear wheels 2 serve as the primary driving wheels and as such produce most of the tractive effort under normal driving conditions. The front wheels 4 function as secondary driving wheels. Each primary wheel 2 is coupled to an axle shaft 8 through which torque is transferred to it, and the two shafts 8 are connected to a primary differential 10. The shafts 8 and differential 10 constitute a primary axle 12. The secondary wheels 4 have the capacity to pivot about upright axes and are coupled to a steering mechanism 14, including a steering wheel, for steering the vehicle A. Each secondary wheel 4 is connected to an axle shaft 16 for transferring torque to it, and the two shafts 16 are connected to a secondary differential 18. The two axle shafts 16 and the secondary differential 18 constitute a secondary axle 20. The primary differential 10 is coupled to a drive shaft 22 through which torque is delivered to the primary axle 12. The secondary differential 18, on the other hand, is coupled to another drive shaft 24 through which torque is delivered to the secondary axle 20.

That torque is derived from the engine 6. The torque which it produces is delivered through a transmission 26 (FIG. 1), so the engine 6 together with the transmission 26 constitute a power unit. The transmission 26 is coupled to the two drive shafts 22 and 24 through a transfer unit or case 28 which serves as a differential between the primary axle 12 and the secondary axle 20 and further apportions torque between the two axles 12 and 20 to best accommodate the conditions under which the vehicle A operates. More specifically, the transfer case 28 provides dynamics control for the vehicle A, which is most effective at elevated speeds, and further enhances traction, primarily at lower speeds.

Figure 2:
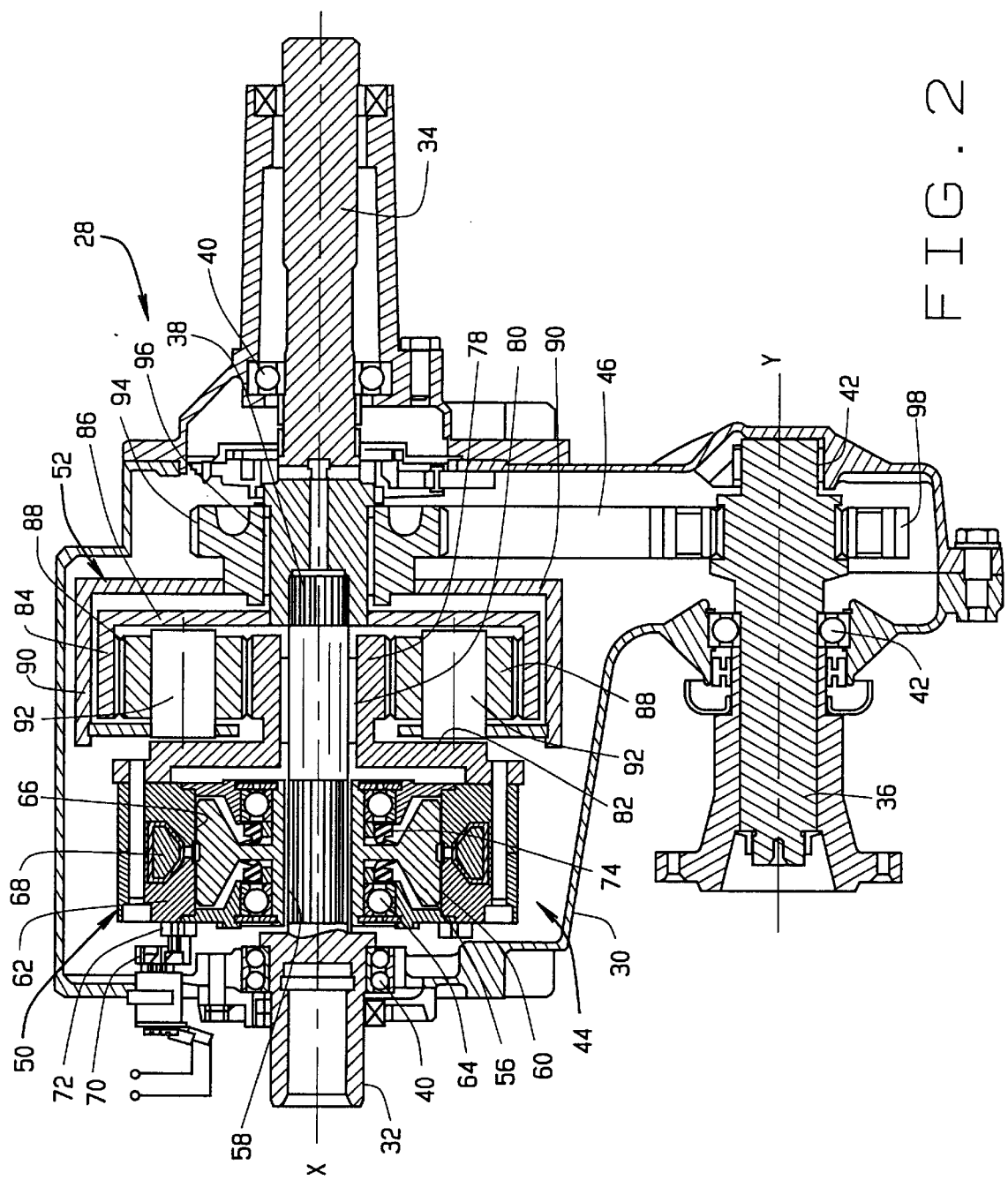
FIG. 2 is a longitudinal sectional view of a transfer case forming part of the torque bias system, which transfer case is best suited where the rear wheels are the primary driving wheels.

The transfer case 28 includes (FIG. 2) a housing 30, an input shaft 32 that is connected to the transmission 26, a primary output shaft 34 that is connected to the primary drive shaft 22, and a secondary output shaft 36 that is connected to the secondary drive shaft 24. The input shaft 32 and primary output shaft 34 are joined together within the housing 30 at mating splines 38 and rotate about a common axis X on bearings 40, always at the same angular velocity. The secondary output shaft 36 rotates in the housing 30 on bearings 42, its axis Y of rotation being offset from the axis X. In addition, the transfer case 24 contains a torque bias coupling 44 which is located around the input and output shafts 32 and 34 to apportion torque between the two output shafts 34 and 36 and, of course, between the primary and secondary axles 12 and 20. The torque bias coupling 44 is connected directly to the input shaft 32 and is connected to the secondary output shaft 36 through a chain 46 that is within the housing 30.

Torque from the transmission 26 passes directly through the transfer case 28 to the primary drive shaft 22 and then to the primary axle 12, inasmuch as the input shaft 32 and the primary output shaft 34 of the case 28 are joined together at the splines 38 and cannot rotate relative to each other. No slippage occurs between the shafts 32 and 34. The torque bias coupling 44, which is located around the input shaft 32, extracts some of the torque delivered to the shaft 32 and transfers it to the secondary output shaft 36. Indeed, it controls and varies the amount of torque extracted, and, of course, what remains goes to the primary output shaft 34. To this end, the torque bias coupling 44 includes a magnetic particle clutch 50 and a planetary gear set 52, both of which are located around the input shaft 32 and organized about the axis X. The coupling 44 provides two paths for delivering torque to the secondary output shaft 36—one a purely mechanical path in which no slippage can occur and the other a clutch path in which slippage may occur. The mechanical path transfers most of the torque that is diverted to the secondary output shaft 36.

Considering the magnetic particle clutch 50 first, it has (FIG. 2) an armature 56 which fits around the input shaft 32 and is coupled to it along mating splines 58. Thus, the armature 56 rotates with the input shaft 32 at the same velocity as the shaft 32. The armature 56 has a cylindrical surface 60 which is presented outwardly away from the axis X. In addition, the clutch 50 has an electromagnet 62 which encircles the armature 56, yet can rotate relative to the armature 56 on bearings 64. The electromagnet 62 also has a cylindrical surface 66, but it is presented inwardly toward the axis X. Indeed, the cylindrical surface 66 of the electromagnet 62 surrounds the cylindrical surface 60 of the armature 56, yet the two cylindrical surfaces 60 and 66 are spaced slightly apart, so that an annular gap exists between them. The electromagnet 62 contains a coil 68 which is energized by an electrical current that is delivered to it through the contacting brushes 70 and slip rings 72, the former being on the housing 30 and the latter on the electromagnet 62. The annular gap between the cylindrical surfaces 60 and 66 on armature 56 and the electromagnetic 62 contains magnetic particles, and seals 74 prevent the particles from escaping and also from entering the bearings 64.

Figure 4:
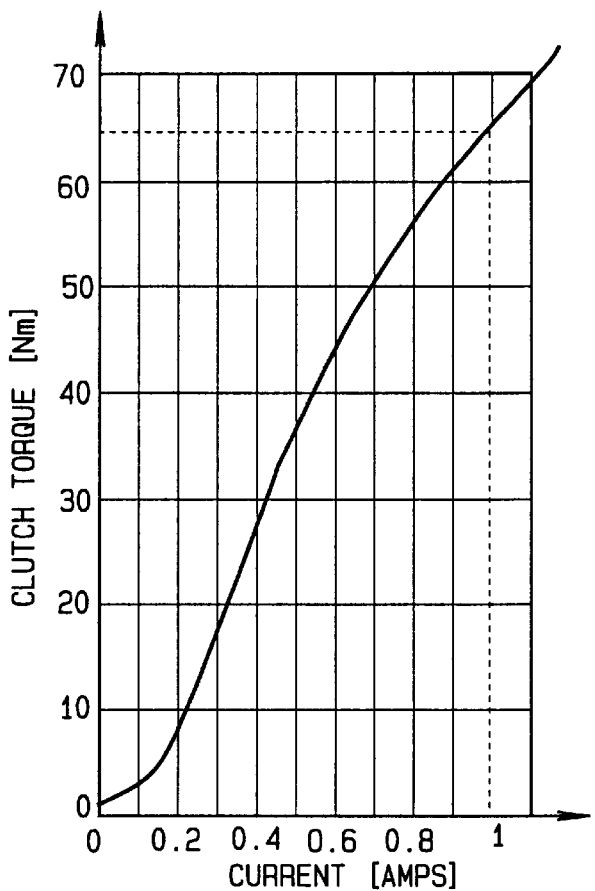
FIG. 4 is a graph showing the relationship of the torque transferred by the magnetic particle clutch of the transfer case and the current conducted in the coil of the clutch.

The clutch 50 transfers torque through the gap between its armature 56 and electromagnet 62, with the transferred torque being extracted from the input shaft 30. The amount of torque transferred depends solely on the current conducted through the coil 68 of the electromagnet, with the relationship between torque and current being nearly linear (FIG. 4).

The planetary gear set 52, which is likewise organized about the axis X, includes (FIG. 2) a sun gear 78 which surrounds the input shaft 32 and is capable of rotating relative to the shaft 32 on a bearing 80. The sun gear 78 is connected firmly to the electromagnet 62 of the clutch 52 through a flange 82. In addition, the planetary set 52 has a ring gear 84 which surrounds the sun gear 78 and is attached to the output shaft 34 through an end plate 86. Between the sun gear 78 and the ring gear 84 and engaged with both are planet gears 88 which also are part of the planetary set 52. Finally, the planetary set 52 has a carrier 90 provided with pins 92 on which the planet gears 88 will rotate when the sun gear 78 rotates relative to the ring gear 84 as a consequence of slippage in the clutch 50. The carrier 90 extends over and encloses the ring gear 84 and its end plate 86 and at its end is connected to a sprocket 94 which encircles the output shaft 34, yet can rotate relative to the output shaft 34 on a bearing 96.

The secondary output shaft 36 within the confines of the housing 30 carries a sprocket 98 which rotates with the shaft 36. The sprocket 98 may be the same size as the sprocket 94 on the carrier 90, but whatever its size, it aligns laterally with that sprocket 94. The chain 46 passes over the two sprockets 94 and 98 so the output shaft 36 rotates with the carrier 90.

If no slippage occurs between the armature 56 and the electromagnet 62 of the clutch 50, the sun gear 78 and ring gear 84 of the planetary set 52 will rotate at the same angular velocity. When this occurs, the planet gears 88 are simply carried around the axis X at the same angular velocity as the sun and ring gears 78 and 84, and the carrier 90, being coupled to the planet gears 88 at its pins 92, rotates at that same velocity as well. Thus, in the absence of slippage in the clutch 50, the two output shafts 34 and 36 will rotate at the same angular velocity.

The axle shafts 8 of the primary axle 12, being coupled to the output shaft 34 of the transfer case 28, rotate with the input shaft 32 without any slippage and likewise with the output of the transmission 26 without slippage, since the output shaft 34 is coupled to the transmission 26 through the input shaft 32. The clutch 50, however, accommodates slippage between the axle shafts 16 of the secondary axle 20 and the input shaft 32 of the transfer case 28, so that the secondary axle shafts 16 can rotate at a velocity different from the velocity at which the primary axle shafts 8 rotate. This may occur when the vehicle A negotiates a turn or when the primary wheels 2 loose traction, but the secondary wheels 4 do not or vice versa. In that event the electromagnet 62 of the clutch 50 turns at a velocity different from the armature 56. Even so, the torque coupling 44 still transmits torque, with the amount of torque transmitted being dependent on the current in the coil 68 of the electromagnet 62.

The torque delivered to the secondary output shaft 36 is extracted from the input shaft 32, leaving less torque for the primary output shaft 34. Basically, the torque transmitted through the primary output shaft 34 plus the torque transmitted through the secondary output shaft 36 equals the torque delivered to the input shaft 32 by the transmission 26. However, not all of the torque extracted from the input shaft 32 and delivered to the secondary output shaft 36 passes through the clutch 50. Only a small portion does. In this regard, it will be recalled that the torque bias coupling 46 provides two paths—a clutch path and a mechanical path. Torque transferred through the clutch path passes from the input shaft 32, through the clutch 50, and then to the sun gear 78 which transfers it to the planet gears 88. The planet gears 88 in turn transfer it to the carrier 90 at the pins 92 which are in the planet gears 88. The torque transferred through the mechanical path passes from the input shaft 32 through the end plate 86 to the ring gear 84. The ring gear 84 transfers it to the planet gears 88 where it combines at the pins 92 with torque transmitted through the clutch path. The carrier 90 transfers the combined torque from the two paths to the sprocket 94 which is attached to it. The sprocket 94 together with the sprocket 98 and the chain 46 deliver the extracted torque to the secondary output shaft 36.

Figure 5:
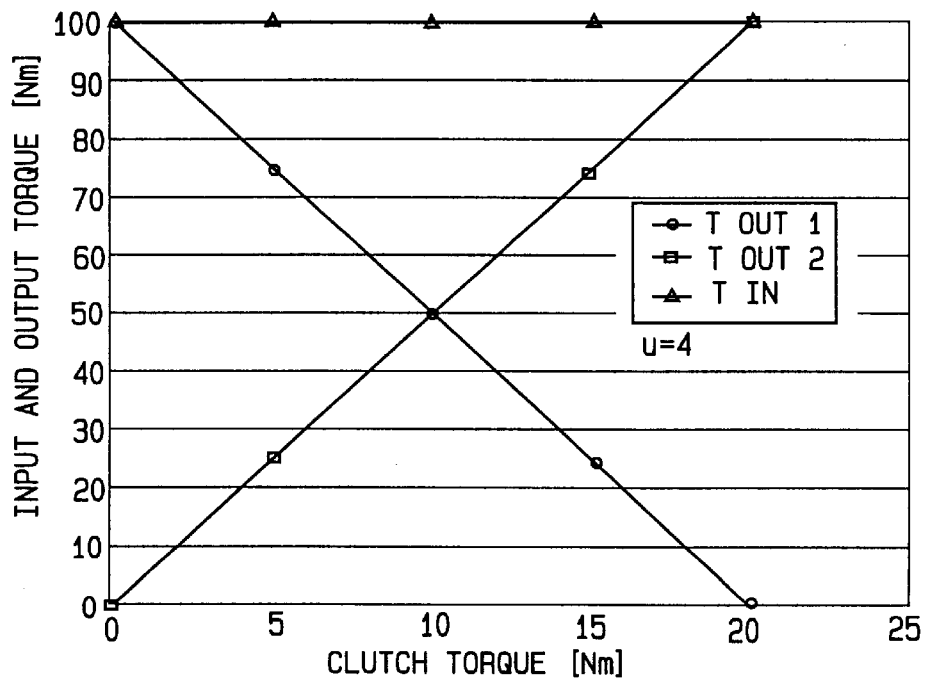
FIG. 5 is a graph showing the relationship between input, primary output and secondary output torque, on one hand, and clutch torque, on the other.

While the clutch path transmits only a small proportion of the torque extracted from the input shaft 32 and delivered by the coupling 44 to the secondary output shaft 36, the clutch 50 controls the amount of torque extracted and, by extension, the amount of torque remaining for transfer to the primary output shaft 34. The relationship between the torque transmitted through the clutch path of the torque bias coupling 44 and the torque delivered to the primary output shaft 34 and the secondary output shaft 36 in which the ratio u between the teeth on the sun gear 78 and the teeth on the ring gear 84 is 4 may be illustrated on Cartesian coordinates (FIG. 5). For example, when the torque at the input shaft 32 amounts to 100 Nm and the torque in the clutch 50, that is the extracted torque passing through the clutch path, is 5 Nm, the torque delivered to the primary output shaft 34 and primary axle 12 is 75 Nm, whereas the torque delivered to the secondary output shaft 36 and secondary axle 20 is 25 Nm. Thus, only one-fifth of the torque that is transferred to the secondary output shaft 36 passes through the clutch 50, so that the clutch 50 may be relatively small and compact.

Figure 6:
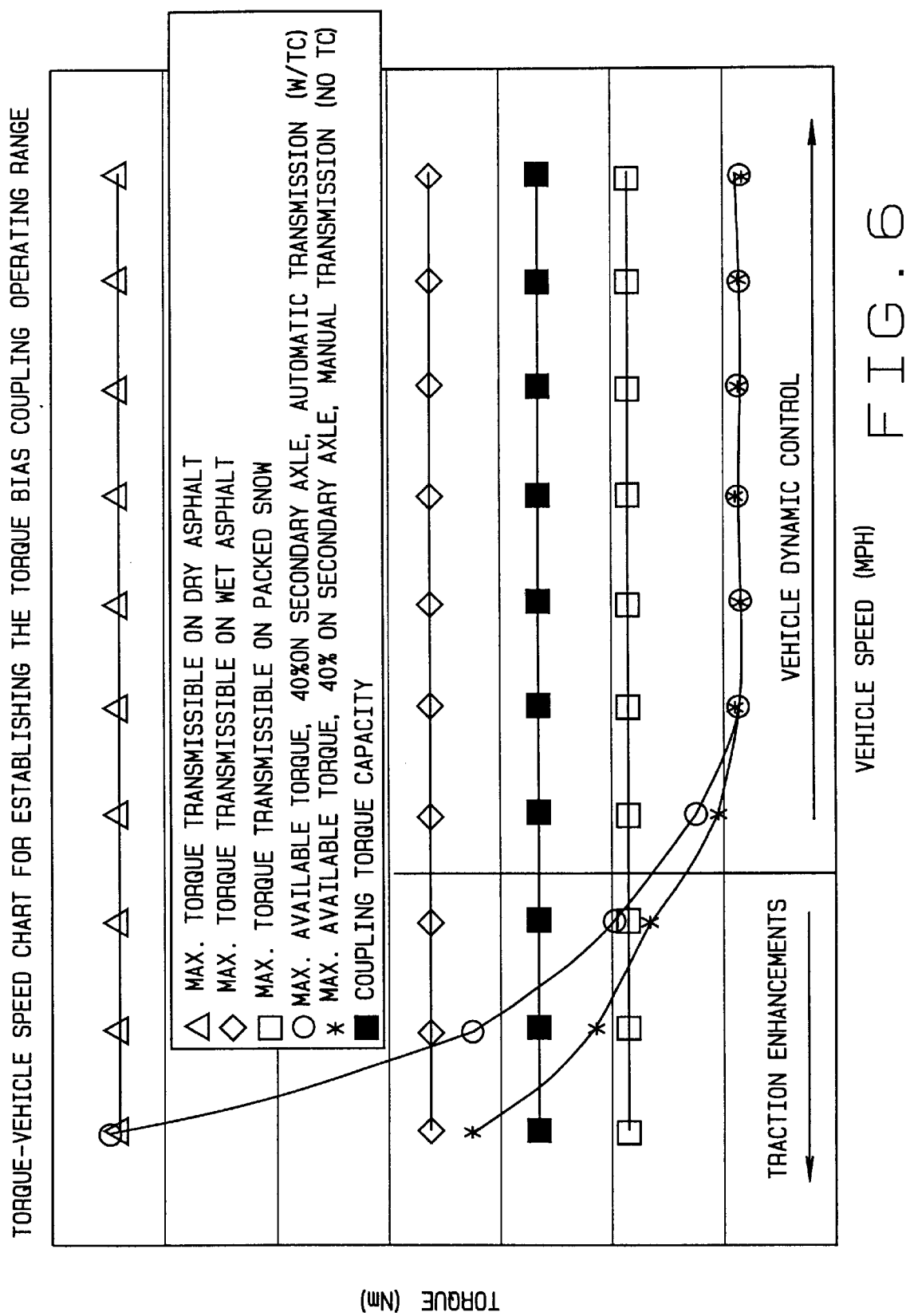
FIG. 6 is a graph showing the relationship between transmissible torque, available torque and torque capacity of the torque bias coupling, on one hand, and vehicle speed on the other.

The maximum torque that the vehicle A can apply to a road surface at either axle 12 or 20 varies with the coefficient of friction between the vehicle wheels 2 and 4 and the surface (FIG. 6). For example, a dry asphalt surface will tolerate more torque than a wet asphalt surface which in turn will tolerate more torque than packed snow. Whenever the torque applied by either axle 12 or 20 to the road surface through its wheels 2 or 4 exceeds the capacity of the surface to accommodate that torque, the wheels 2 or 4 will spin on the surface. Perhaps the torque capacity of the coupling 50, insofar as the transfer of torque to the secondary axle 20 is concerned, should exceed the tractive capacity on packed snow, although maybe not on wet asphalt. In any event, when the vehicle A operates at moderate and high speeds, such as the speeds one would encounter in highway driving, the torque available at the secondary axle 20, which is the torque transferred through the torque bias coupling 44, should remain relatively low and indeed below the torque at which wheels will spin. At lower speeds, where traction enhancement is desired, the torque delivered at the secondary axle 20 should be higher.

Figure 7:
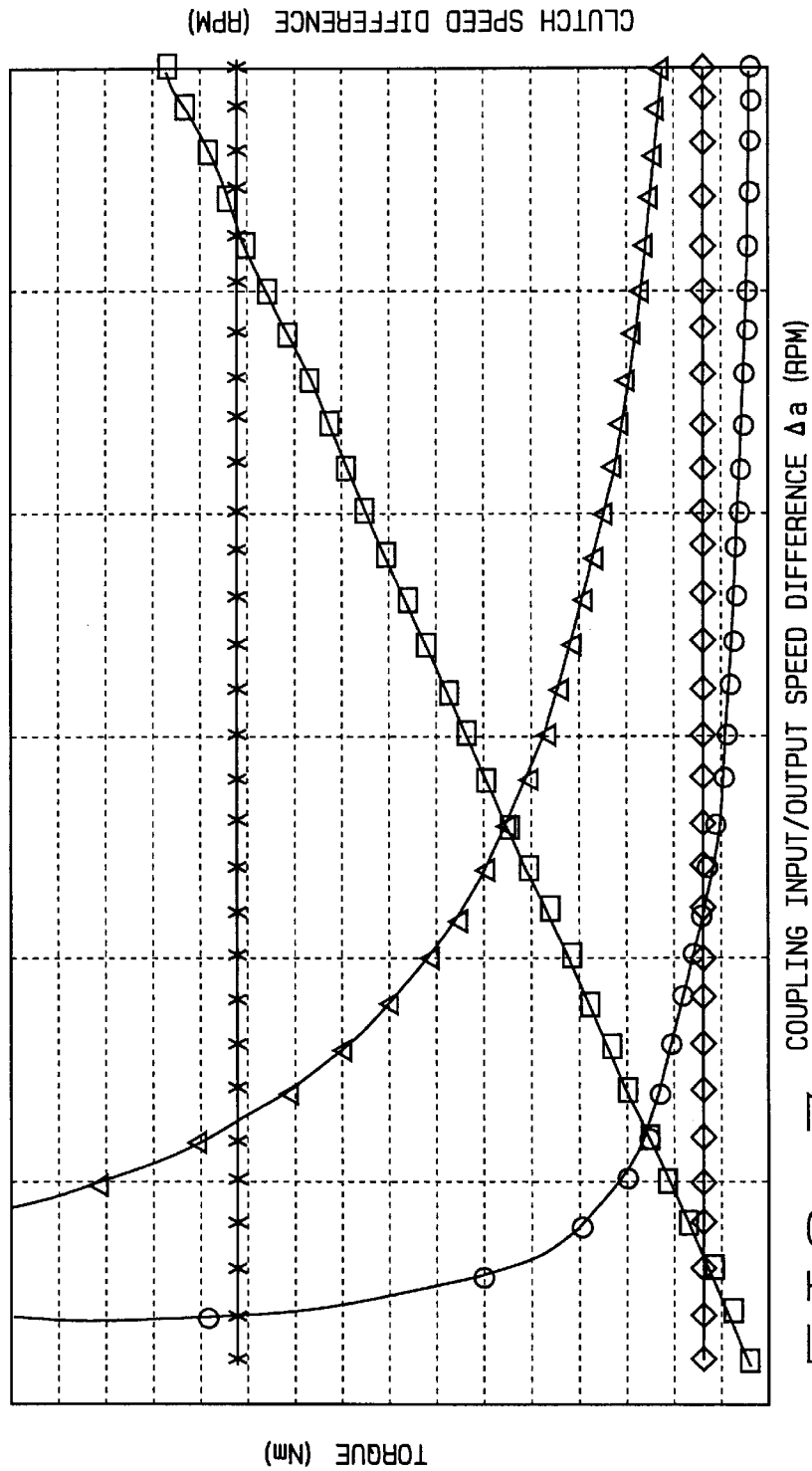
FIG. 7 is a graph showing the relationship between power dissipation capacity under continuous and intermittent slip conditions as well as clutch and torque coupling capacity in terms of torque and speed differential in the clutch, on one hand, and the speed differential in the coupling on the other

Since the clutch 50 transmits torque while accommodating slippage between armature 56 and electromagnet 62, it dissipates power, and that power at any instant is equal to the torque transmitted through the clutch 50 multiplied by the difference in angular velocity between its armature 56 and its electromagnet 62. That lost power manifests itself in the dissipation of heat (FIG. 7), but the capacity the clutch 50 to dissipate heat is limited. On a continuous basis, the capacity of the clutch 50 to dissipate heat—or power—is less than on an intermittent basis. That capacity may be demonstrated by lines of constant power loss on Cartesian coordinates (FIG. 7). Thus, the clutch 50 may occasionally, at spaced intervals, operate at a torque and speed differential that exceeds the constant power limit for continuous operation, but usually not the constant power limit for intermittent operation.

Figure 8:
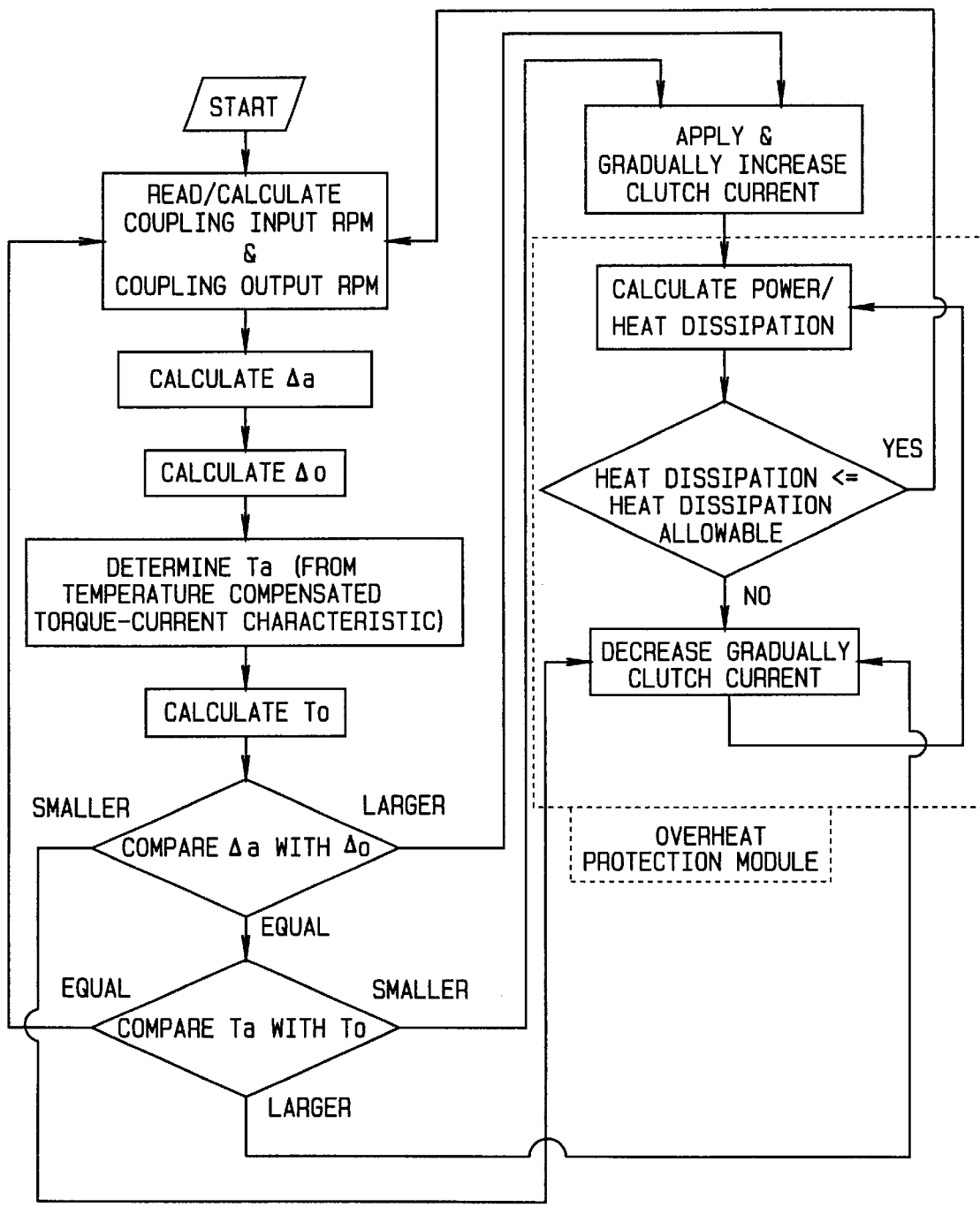
FIG. 8 is a block diagram showing the control strategy for the torque coupling in the transfer case.

A control process (FIG. 8) for operating the vehicle A takes into account the limited capacity of the clutch 50 in the torque bias coupling 44 to dissipate power in the form of heat and driving conditions as well. The process relies on a controller having microprocessor that receives and processes electrical signals received from sensors, and those signals reflect:

1. the angular velocity of the input shaft 32
2. the angular velocity of the secondary output shaft 36 or sprocket 94
3. longitudinal acceleration
4. transverse or lateral acceleration
5. steering wheel position
6. position of throttle for motor 6
7. transmission gear The controller includes a clutch overheat protection module.

The controller begins (FIG. 8) with reading and calculating the angular velocity for the input shaft 32 and angular velocity of the secondary output shaft 36. Next, the controller calculates the difference $\Delta_a$ in the two velocities, which is the magnitude of slip actually occurring in the torque bias coupling 44, that is to say, the velocity at which the input shaft 32 is rotating faster that the secondary output shaft 36. Also, the controller calculates the desired or optimal difference $\Delta_o$ that should exist between the velocities of the shafts 32 and 36 under the operating conditions then experienced by the vehicle A. This calculation takes into account the following operating conditions:

1. the angular velocity of the wheels 2
2. the angular velocity of the wheels 4
3. longitudinal acceleration experienced by the vehicle A at the time
4. transverse acceleration of the vehicle A
5. steering angle which is determined from the steering mechanism 14
6. the transmission ratio, that is the speed of the engine 6 compared with the speed of the transmission output, which is the angular velocity of the input shaft 32
7. the position of the throttle on the engine 6

The controller further determines the torque $T_a$ transferred through the torque bias coupling 44, this being ascertained from the current passing through the coil 68 of the clutch 50 (FIG. 4) with compensation for temperature (temperature compensated torque—current characteristic). The controller goes on to calculate the desired or optimal torque $T_o$ under the operating conditions encountered at the time, and this calculation takes into account the same factors used in the calculation of the optimal speed differential $\Delta_o$. Once the actual and optimal speed differentials $\Delta_a$ and $\Delta_o$ are calculated, the controller compares the actual speed differential $\Delta_a$ with the optimal speed differential $\Delta_o$.

If the actual speed differential $\Delta_a$ is less than the optimal speed differential $\Delta_o$, the controller sends a signal to its overheat protection module which gradually decreases the current in the clutch 50 of the coupling 44. This reduces the torque transmitted through the clutch path of the controller 44 which in turn produces an even larger decrease in the torque $T_a$ transmitted through coupling 44 itself. In short, less torque $T_a$ is extracted from the input shaft 32 for transfer to the secondary output shaft 36, leaving more torque for the primary output shaft 34. After the decrease, the module calculates the heat dissipation or power loss $P_a$ which is actually the torque $T_a$ transmitted through the coupling 44 multiplied by the actual speed differential $\Delta_a$ in the coupling 44. Then the module compares the power loss $P_a$ with the maximum acceptable power loss $P_m$ at the speed differential. If it is within an acceptable range, the calculation begins all over again from the very beginning, that is, with the comparison of the actual velocities of the shafts 32 and 36. If the power loss $P_a$ is not within acceptable limits, the module decreases the current in the clutch 50 still further, and again the power dissipation $P_a$ is calculated and a comparison is made to determine if it is within acceptable limits.

On the other hand, if the comparison of the actual speed differential $\Delta_a$ in the coupling 44 exceeds the optimal speed differential $\Delta_o$ as calculated for the operating conditions, then the controller sends a different signal to the overheat protection module, and the module applies a gradual increase in the current passing through the clutch 50. This causes the clutch 50 to transfer more torque and the coupling 44 to extract even more torque $T_a$ from the input shaft 32, leaving less for the primary output shaft 34, but providing more for the secondary output shaft 36. Thereupon, the module calculates the power dissipation $P_a$ and makes a comparison to determine if the power dissipation $P_a$ is with acceptable limits, all as previously discussed.

Finally, if the controller, in comparing the actual speed differential $\Delta_a$ with the optimal speed differential $\Delta_o$, finds that they are equal, the controller then compares the actual torque $T_a$ transmitted by the coupling 44 with the optimal torque $T_o$ for the coupling under the existing operating conditions. If the actual torque $T_a$ is larger than the optimal torque $T_o$, the controller sends a signal to the overheat protection module which gradually decreases the actual torque $T_a$, using the sequence previously described for when the actual speed differential $\Delta_a$ is less than the optimal spaced differential $\Delta_o$. On the other hand, if the actual torque $T_a$ transmitted by the coupling 44 is smaller than the optimal torque $T_o$, the controller gradually increases the current in the clutch 50 of the controller and sends a signal representing the increase to the overheat protection module which processes it the same as the signal generated in response to an actual speed differential $\Delta_a$ being greater then the optimal speed differential $\Delta_o$ Finally, if the controller, in making its comparison of actual torque $T_a$ with optimal torque $T_o$ for the coupling 44, finds that they are equal, the controller begins the whole analysis again, that is, beginning with reading the angular velocities of the input shaft 32 and secondary output shaft 36.

Figure 9:
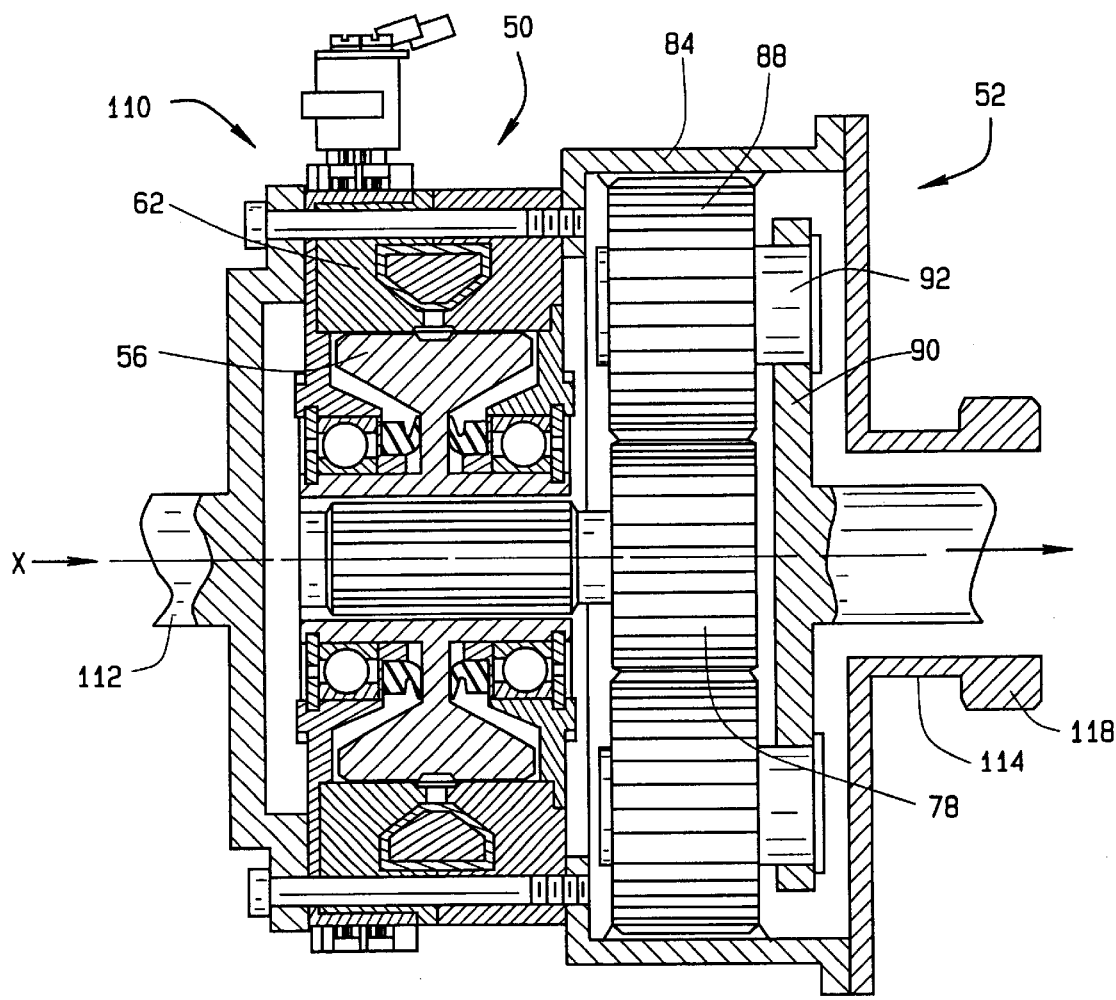
FIG. 9 is a sectional view of a modified transfer case best suited where the front wheels are the primary driving wheels.
Figure 10:
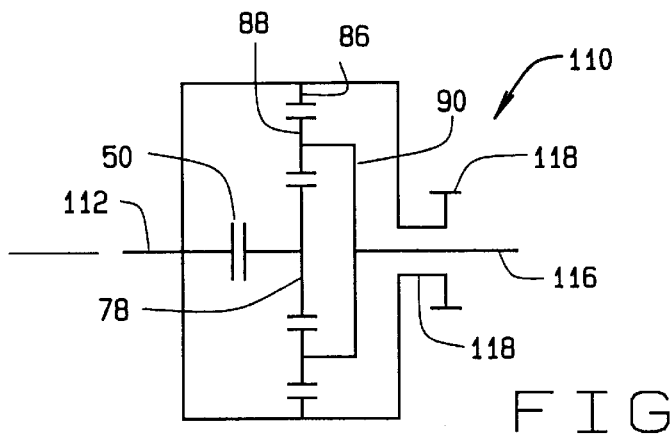
FIG. 10 is a kinematic diagram of the transfer case of FIG. 9.

One objective of the transfer case 28, of course, is to apportion the torque available at the transmission 26 between the primary axle 12 and secondary axle 20 to best accommodate the driving conditions at any instant, and those conditions are determined by the sensors which monitor vehicle speed, longitudinal and lateral accelerations, steering angle, throttle position and speed of the individual wheels 2 and 4. But within the overall objective lies another objective, and that is to insure that power loss $P_a$ within the clutch 50 of the torque bias coupling 44 remains below prescribed limits, there being one limit for continuous driving conditions at any speed differential $\Delta_a$ between the input shaft 32 and the secondary output shaft 36 and another limit for intermittent operation (FIG. 7). The controller enables the transfer case 28 to fulfill these objectives.

Where the front wheels 2 function as the primary driving wheels and the rear wheels 4 as the secondary wheels, a torque bias coupling 110 of slightly different configuration is employed (FIG. 9). The coupling 110 includes an input shaft 112, a primary output shaft 114 that is coupled to the front axle 20, and a secondary output shaft 116 that is coupled to the rear axle 12. The coupling 110 also includes a magnetic particle clutch 50 and a planetary gear set 52 which are essentially the same as their counterparts in the transfer case 28, but are connected slightly differently.

The input shaft 112 is connected to the electromagnet 62 of the clutch 50 and to the ring gear 84 of the planetary set 56, and the ring gear 84, in turn, is connected to the primary output shaft 34 which carries a sprocket 118. The sun gear 78, on the other hand, is connected to the armature 56 of the clutch 50. The secondary output shaft 116 is connected to the carrier 90 of the planetary set 52. Thus, the primary output shaft 114 and the input shaft 112 rotate at the same angular velocity, that is, without any slippage between the two. The secondary output shaft 116, on the other hand, can rotate at a lesser angular velocity than the input shaft 112, owing to slippage within the clutch 50.

Other planetary hook-ups may be used in the couplings 44 and 110, but in any such hook-up the torque that is transferred through the magnetic particle clutch should pass through the low torque element of the planetary set, whatever configuration the planetary set may take. While a magnetic particle clutch is preferred for either of the couplings 44 and 110, other type of clutches will work. Included among these acceptable clutches are simple electromagnetic clutches or electromagnetic multiplate clutches.

| ACTIVE TORQUE BIAS SYSTEM AND CONTROLS | | | |
|---|---|---|---|
| A | vehicle | 56 | armature |
| 2 | rear wheels | 58 | splines |
| 4 | front wheels | 60 | cylindrical surface |
| 6 | engine | 62 | electromagnetic |
| 8 | axle shaft | 64 | bearing |
| 10 | primary differential | 66 | cylindrical surface |
| 12 | primary axle | 68 | coil |
| 14 | steering mechanism | 70 | brushes |
| 16 | axle shafts | 72 | slip rings |
| 18 | secondary differential | 74 | seals |
| 20 | secondary axle | 78 | sun gear |
| 22 | propeller shaft | 80 | bearing |
| 24 | propeller shaft | 82 | flange |
| 26 | transmission | 84 | ring gear |
| 28 | transfer case | 86 | end plate |
| 30 | housing | 88 | planet gears |
| 32 | input shaft | 90 | carrier |
| 34 | output shaft | 92 | pins |
| 36 | output shaft | 94 | sprocket |
| 38 | splines | 96 | bearing |
| 40 | bearings | 98 | sprocket |
| 42 | bearings | 110 | torque bias coupling |
| 44 | torque bias coupling | 112 | input shaft |
| 46 | chain | 114 | primary output shaft |
| 50 | magnetic particle clutch | 116 | secondary output shaft |
| 52 | planetary gear set | 118 | sprocket |

What is claimed is:
1. In an automotive vehicle having primary and secondary wheels on primary and secondary axles, respectively, and a power unit that produces torque, the improvement comprising:
    a transfer unit including;
        an input connected to the power unit;
        a primary output coupled with the input such that no slippage occurs between them;
        a secondary output; and
        a torque bias coupling connecting the input with the secondary output and including a clutch and a plan- etary gear set coupled such that torque will transfer through the coupling in two paths, one a clutch path in which slippage occurs and the other a mechanical path in which no slippage occurs, with most of the torque passing though the mechanical path; and a controller which monitors the torque transmitted through the coupling and insures that slippage within the clutch of the clutch path does not produce a power dissipation which exceeds a prescribed limit.

2. The combination according to claim 1 wherein the controller determines the difference between the angular velocity of the input and the secondary output and also determines an optimal difference between the two velocities under the same driving conditions, and compares the two differences.

3. The combination according to claim 1 wherein the controller ascertains the torque transferred by the coupling and determines the optimal torque that should be transferred by the coupling under the same driving conditions and compares the two torques.

4. The combination according to claim 3 wherein the clutch is electrically operated.

5. The combination according to claim 4 wherein the controller derives the torque transferred by the coupling by correlating current in the clutch with a specific torque from a torque—current characteristic for the clutch.

6. The combination according to claim 1 wherein the clutch is a magnetic particle clutch.

7. The combination according to claim 1 wherein the controller sets a first power dissipation limit for continuous slippage and a second power dissipation limit for intermittent slippage and insures that the torque transmitted through the coupling does not produce on a continuous basis a power loss that exceeds the limit for continuous slippage while permitting excursions above that limit or an intermittent basis, and further that the torque transmitted through the coupling does not produce on an intermittent basis a power loss that exceeds the limit for the intermittent basis.

8. The combination according to claim 1 wherein the clutch of the coupling includes inner and outer components, one of which is an electromagnet and the other an armature, and magnetic particles between the components; and wherein the planetary set of the coupling includes a sun gear rigidly coupled with one of the components of the clutch, a ring gear fixed in position with respect to the other component, a planet gear between the sun and ring gears, and a carrier providing an axis about which planet gear rotates.

9. In an automotive vehicle having primary and secondary wheels on primary and secondary axles, respectively, and a power unit that produces torque, the improvement comprising:

a transfer unit including;
an input connected to the power unit;
a primary output coupled with the input such that no slippage occurs between them;
a secondary output;
a torque bias coupling located between the input and secondary output and including an electromagnetic clutch and a planetary gear set; the planetary gear set including a low torque gear and a higher torque gear, the clutch, gear set, input and output being connected such that torque transfers between the input and the secondary output through the higher torque gear and also between the input and secondary output through the clutch and the low torque gear, with the proportion of torque diverted from the input to the secondary output being dependent the current in the electromagnetic clutch; and a controller for monitoring speed differential between input and the secondary output and comparing it with an optimal speed differential for the conditions under which the vehicle operates to insure that the power dissipated in the clutch remains within acceptable limits.

10. The combination according to claim 9 wherein the controller ascertains the torque transferred by the coupling and determines the optimal torque that should be transferred by the coupling under the same driving conditions and compares the two torques.

11. The combination according to claim 10 wherein the controller derives the torque transferred by the coupling by correlating current in the clutch with a specific torque from a torque—current characteristic for the electromagnetic clutch.

12. The combination according to claim 11 wherein the clutch is a magnetic particle clutch.

13. The combination according to claim 9 wherein the clutch is a magnetic particle clutch.

14. The combination according to claim 9 wherein the controller sets a first power dissipation limit for continuous slippage and a second power dissipation limit for intermittent slippage and insures that the torque transmitted through the coupling does not produce on a continuous basis a power loss that exceeds the limit for continuous slippage while permitting excursions above that limit or an intermittent basis, and further that the torque transmitted through the coupling does not produce on an intermittent basis a power loss that exceeds the limit for the intermittent basis.

15. The combination according to claim 9 wherein the clutch of the coupling includes inner and outer components, one of which is an electromagnet and the other an armature, and magnetic particles between the components; and wherein the planetary set of coupling includes a sun gear rigidly coupled with one of the components of the clutch, a ring gear fixed in position with respect to the other component, a planet gear between the component, and a carrier providing an axis about which planet gear rotates.

16. A process for distributing torque produced by a power unit in an automotive vehicle between first and second axles on the vehicle, said process comprising:

transferring torque from the power unit to the first axle without slippage;

transferring torque from the power unit to the second axle through an electrically operated clutch and planetary gear set in a clutch path in which slippage may occur, and further transferring torque from the power unit to the second axle through the planetary gear set in a mechanical path in which slippage does not occur, all such that the current passing through the clutch controls the proportion of torque divided from the input to the second axle;

monitoring the speed differential in the clutch; and using the speed differential to insure that the power dissipated in the clutch does not exceed a prescribed limit.

17. The process according to claim 16 wherein the clutch is a magnetic particle clutch.

18. The process according to claim 16 and further comprising comparing the speed differential in the clutch with an optimal speed differential for the conditions under which the vehicle operates at the time the comparison is made.

19. The process according to claim 16 and further comprising determining the torque transferred to the second axle and comparing that torque with the optimal torque to be transferred to the second axle under the conditions that the vehicle operates at the time the comparison is made.

20. The process according to claim 19 wherein the torque transferred to the second axle is determined by measuring the current passing through the clutch and from a torque-current characteristic for the clutch, correlating the current with a specific torque.

21. The process according to claim 19 wherein less torque is transferred through the clutch path than through the mechanical path.

22. The process according to claim 19 and further comprising setting a first power dissipation limit for continuous slippage and a second power dissipation limit for intermittent slippage and insuring that the torque transmitted through the coupling does not produce on a continuous basis a power loss that exceeds the limit for continuous slippage, while permitting excursions above that limit or an intermittent basis, and further that the torque transmitted through the coupling does not produce on an intermittent basis a power loss that exceeds the limit for the intermittent basis.

* * * * *